United States Patent [19]

Archer et al.

[11] Patent Number: 5,439,999
[45] Date of Patent: Aug. 8, 1995

[54] BULK POLYMERISATION PROCESS AND PRODUCT

[75] Inventors: Adrian Archer, Penfields; Mohsen Zakikhani, both of Kidderminster, England

[73] Assignee: Albright & Wilson Limited, Oldbury, United Kingdom

[21] Appl. No.: 199,676

[22] Filed: Feb. 22, 1994

[30] Foreign Application Priority Data

Mar. 24, 1993 [GB] United Kingdom ............... 9306109

[51] Int. Cl.$^6$ ............................................. C08F 30/02
[52] U.S. Cl. ................................................. 526/278
[58] Field of Search ....................................... 526/278

[56] References Cited

U.S. PATENT DOCUMENTS

| | | |
|---|---|---|
| 2,439,214 | 4/1948 | Lindsey, Jr. . |
| 2,743,261 | 4/1956 | Coover, Jr. et al. . |
| 3,726,839 | 4/1973 | Jin . |
| 3,763,122 | 10/1973 | Elfers . |
| 3,991,134 | 11/1976 | Kraft et al. . |
| 3,993,715 | 11/1976 | Hwa et al. . |
| 4,035,571 | 7/1977 | Brunner et al. . |
| 4,444,969 | 4/1984 | Younes . |
| 5,109,033 | 4/1992 | Grey et al. ............... 526/278 |
| 5,116,882 | 5/1992 | Grey et al. ............... 526/278 |

FOREIGN PATENT DOCUMENTS

| | | | |
|---|---|---|---|
| 3942641 | 2/1991 | Germany | 526/278 |
| 2102427 | 2/1983 | United Kingdom . | |
| 427958 | 6/1975 | U.S.S.R. | 526/278 |

OTHER PUBLICATIONS

CA72:32262 Mashlyakovskii et al. Vysokomol. Sordin Ser. B, 11(10), 712–13—1969.
CA 71:70973 "Copolymers of alpha–phenylvinyl phosphonic acid with vinyl monomers" Alovitdinov et al.—Plast. Massy (6), 13–15—1969.

Primary Examiner—Joseph L. Schofer
Assistant Examiner—N. Sarofin
Attorney, Agent, or Firm—Frishauf, Holtz, Goodman & Woodward

[57] ABSTRACT

Copolymers of aryl phosphonic acids can be made in a bulk polymerization process with unsaturated monomeric hydrocarbons. Preferred are alpha-phenyl vinyl phosphonic acid and styrene. Bulk polymerization process avoids suspending agents, emulsifying agents or water. Absence of halogen avoids environmental problems. A free radical initiator is required.

11 Claims, No Drawings

BULK POLYMERISATION PROCESS AND PRODUCT

This invention relates to a bulk polymerisation method and in particular to the bulk copolymerisation of an aryl-substituted phosphonic acid having some unsaturation and an unsaturated hydrocarbon monomer.

The present invention also relates to copolymers produced by means of the aforesaid method and to their use, in the form of processed plastics materials or of powders, as flame-retardants.

It is known to prepare copolymers of certain aryl-substituted phosphonate esters and unsaturated monomers by means of suspension polymerisation, emulsion-polymerisation and solution-polymerisation. Some of these copolymers are capable of being processed to form transparent plastics materials and, in addition, some of the copolymers are inherently flame-retardant.

We have now found that copolymers of superior processing and flame-retardant qualities can be made in a bulk-polymerisation process from aryl-substituted phosphonic acids and unsaturated hydrocarbon monomers. Bulk polymerisation (ie absence of suspending agent, emulsifying agent or water) results in a quicker and more efficient reaction. The absence of halogen from the reaction avoids environmental problems.

Accordingly, the present invention provides a method for the production of a copolymer of an aryl-substituted phosphonic acid containing at least one unsaturated carbon-to-carbon bond and an unsaturated hydrocarbon monomer, in which the phosphonic acid and the monomer are subjected to bulk polymerisation in the presence of a free-radical initiator.

The present invention also provides a copolymer produced by the method described in the immediately preceding paragraph, and further provides the use of such a copolymer as a flame-retardant.

The method of bulk polymerisation according to the present invention may suitably include the following steps:
(a) heating a mixture of the phosphonic acid with sufficient of the unsaturated monomer to dissolve the acid but insufficient to cause significant homopolymerisation of the monomer;
(b) further heating the mixture (a) under an inert atmosphere;
(c) adding thereto a quantity of the free-radical initiator;
(d) further heating the mixture (a) and the free-radical initiator;
(e) adding, in a dropwise manner, the required stoichiometric quantity of the unsaturated monomer (in which is dissolved a further quantity of the free-radical initiator) to bring about substantially complete copolymerisation;
(f) further heating the phosphonic acid, the monomer and the free-radical initiator until copolymerisation is complete; and
(g) recovering the copolymer so produced.

The phosphonic acid may be a substituted vinyl phosphonic acid, for example, alpha-phenyl vinyl phosphonic acid.

The unsaturated monomer may be styrene.

Alternatively, the unsaturated monomer may be acrylic acid, an acrylate, methacrylic acid, a methacrylate, an alkyl-substituted methacrylate (eg methyl methacrylate) or an acrylamide.

The inert atmosphere in step (b) of the method may suitably consist essentially of gaseous nitrogen.

Preferably, the free-radical initiator is azo-bis isobutyronitrile (AIBN). The free-radical initiator may be dissolved in a compatible solvent before being added in step (c) of the method. The solvent may be, for example, toluene.

After recovery, the copolymer may be processed direct, for example, by melting and extrusion, alone or with other additives, to form a processed plastics material, which may also be transparent.

Alternatively, the copolymer may be dissolved and precipitated to form a powder, which again can be used alone or as an additive for other polymers.

Some of the copolymers according to the present invention have been found to have flame-retardant properties.

The present invention will be illustrated by way of the following Examples:

EXAMPLE 1

Styrene (10 g) and alpha-phenyl vinyl phosphonic acid (10 g) were charged to a 100 ml three-necked round-bottomed flask equipped with a condenser, a nitrogen inlet, a mechanical stirrer and a dropping funnel. The flask was placed in an oil-bath at 90° C. and purged with nitrogen for ½ h. Azo-bis-isobutyronitrile (AIBN) (0.1 g) was added and reacted for ½ h. A mixture of styrene (30 g) and AIBN (0.6 g) was added dropwise over 3 h. A further 3 h reaction time was given and the reaction vessel cooled to ambient temperature.

The product copolymer was dissolved in tetrahydrofuran (100 ml) and precipitated into n-hexane, to give a white powder. $^{31}$P NMR analysis of the copolymer in solution showed that the conversion of monomeric alpha-phenyl vinyl phosphonic acid to copolymer was 87%.

EXAMPLE 2

Styrene (60 g) and alpha-phenyl vinyl phosphonic acid (60 g) were charged to a 1 l reaction vessel equipped as described in Example 1. The flask was placed in an oil-bath at 90° C. and purged with nitrogen for ½ h. AIBN (0.3 g) in toluene (10 ml) was added and reacted for ½ h. A mixture of styrene (180 g), AIBN (2.4 g) and toluene (100 ml) were added dropwise over 2½ h. After the completion of this addition, toluene (350 ml) was added dropwise over 3 h and then the reaction vessel cooled to ambient temperature. The conversion of monomeric alpha-phenyl vinyl phosphonic acid to copolymer was 87% as assessed by $^{31}$P NMR.

Flame-Retardancy Testing

Poly(alpha-phenyl vinyl phosphonic acid-co-styrene) copolymer was moulded to form transparent rectangular plaques and tested in accordance with ANSI/UL94 testing procedures. The tests indicated that the copolymer should be rated at V-0.

We claim:
1. A method for the production of a copolymer of an aryl-substituted phosphonic acid, said phosphonic acid containing at least one unsaturated carbon-to-carbon bond, with an unsaturated hydrocarbon monomer, wherein said method comprises subjecting said phosphonic acid and said monomer to bulk polymerisation in the presence of a free-radical initiator, wherein said bulk polymerisation comprises the following stages:

(a) heating a mixture of said phosphonic acid with sufficient of said unsaturated monomer to dissolve said acid but insufficient to cause significant homopolymerisation of said monomer;

(b) further heating said mixture under an inert atmosphere;

(c) adding to said mixture a quantity of said free-radical initiator;

(d) further heating said mixture and said free-radical initiator;

(e) adding, in a dropwise manner, the required stoichiometric quantity of said unsaturated monomer (wherein a further quantity of said free-radical initiator is dissolved) to bring about essentially complete copolymerisation of said phosphonic acid and said monomer;

(f) further heating said phosphonic acid, said monomer and said free-radical initiator until copolymerisation is complete; and (g) recovering said copolymer so produced.

2. The method of claim 1, wherein said phosphonic acid is a substituted vinyl phosphonic acid.

3. The method of claim 2, wherein said phosphonic acid is alpha-phenyl vinyl phosphonic acid.

4. The method of claim 2, wherein said unsaturated monomer is styrene.

5. The method of claim 2, wherein said unsaturated monomer is selected from acrylic acid, acrylates, methacrylic acid, methacrylates, alkyl-substituted methacrylates and acrylamides.

6. The method of claim 5, wherein said unsaturated monomer is methyl methacrylate.

7. The method of claim 1, wherein said inert atmosphere in stage (b) consists essentially of gaseous nitrogen.

8. The method of claim 2, wherein said free-radical initiator is azo-bis-isobutyronitrile.

9. The method of claim 1, wherein, in stage (c) said free-radical initiator is dissolved in a solvent before being added to said mixture.

10. The method of claim 9, wherein said solvent is toluene.

11. The method of claim 3, wherein said unsaturated monomer is styrene or methylmethacrylate.

* * * * *